3,763,119
ACRYLIC ESTER VINYLBENZYL CHLORIDE
ELASTOMERS
Robert D. De Marco, Avon Lake, and Harold A. Tucker, Shaker Heights, Ohio, assignors to The B. F. Goodrich Company, New York, N.Y.
No Drawing. Filed Feb. 16, 1972, Ser. No. 226,973
Int. Cl. C08f 15/26, 15/40
U.S. Cl. 260—80.76
9 Claims

ABSTRACT OF THE DISCLOSURE

Acrylic ester elastomers of improved processing safety are prepared by polymerizing together a major amount of an acrylic ester monomer and a minor amount of vinyl benzyl chloride monomer and optionally a minor amount of a copolymerizable vinyl monomer containing a terminal vinylidene group. When admixed with vulcanizing agents, the elastomers exhibit increased scorch time without a comparable increase in cure time.

BACKGROUND OF THE INVENTION

Polyacrylic ester elastomers having a reactive halide cure site are known. Such polymers are vulcanized through the halide cure site using various polyamines and sulfur/fatty acid soap systems. Although these vulcanizates are useful, the elastomer/curative combinations often undergo premature cure, or scorch, during processing and forming operations. This causes the elastomer to stiffen or toughen, making it difficult to process and resulting in incomplete mold filling, vulcanizates having poor appearance and poor physical properties, and generally in waste of elastomer, curatives, and other compounding ingredients. Lower temperatures may be employed to increase processing safety but this results in increased handling time per article and decreased output. A more favorable solution would be to increase processing safety without increasing processing or cure times.

SUMMARY OF THE INVENTION

Elastomeric acrylic ester polymers, comprised of at least 50 percent by weight of an acrylic ester, from about 0.5 percent to about 20 percent by weight of vinyl benzyl chloride, and up to 30 percent by weight of a copolymerizable vinyl monomer containing a terminal vinylidene group, exhibit improved processing safety when admixed with curatives yet require no increase in cure time.

DETAILED DESCRIPTION

The novel elastomers are prepared by polymerizing together a major amount of acrylic ester monomer with a small amount of vinyl benzyl chloride monomer.
The acrylic ester monomers have the formula

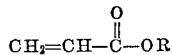

where R is selected from the group consisting of an alkyl radical containing 2 to 18 carbon atoms, an alkoxyalkyl radical containing a total of 2 to 10 carbon atoms, and a cyanoalkyl radical containing 2 to 20 carbon atoms. The alkyl structure can contain primary, secondary, or tertiary carbon configurations. Examples of such acrylic esters are ethyl acrylate, propyl acrylate, n-butyl acrylate, isobutyl acrylate, n-pentyl acrylate, isoamyl acrylate, n-hexyl acrylate, 2-methylpentyl acrylate, n-octyl acrylate, 2-ethylhexyl acrylate, n-decyl acrylate, n-dodecyl acrylate, n-octadecyl acrylate, and the like; methoxymethyl acrylate, methoxyethyl acrylate, ethoxyethyl acrylate, butoxy ethyl acrylate, ethoxypropyl acrylate, and the like, α and β-cyanoethyl acrylate, α, β and γ-cyanopropyl acrylate, cyanobutyl acrylate, cyanohexyl acrylate, cyanooctyl acrylate, and the like; or mixtures thereof.

More preferred are the acrylic esters wherein R is an alkyl radical containing 2 to about 10 carbon atoms or an alkoxyalkyl radical containing a total of 2 to about 6 carbon atoms. Examples of such more preferred monomers are ethyl acrylate, propyl acrylate, n-butyl acrylate, n-pentyl acrylate, n-hexyl acrylate, n-octyl acrylate, 2-ethylhexyl acrylate, and the like; methoxyethyl acrylate, ethoxyethyl acrylate, and the like; and mixtures thereof.

The acrylic ester monomers are used in amounts of at least 50 percent by weight of the total weight of monomer charged. More preferably, they are used in the range from about 70 percent to about 99 percent by weight of the monomers charged. A particularly useful combination of acrylic esters is at least 35 percent by weight of an alkyl acrylate(s) and up to 64 percent by weight of an alkoxy acrylate(s) based on the weight of monomer charged.

The vinyl benzyl chloride monomer can be of the ortho, meta, or para structure, but usually is prepared and employed as a mixture of the meta and para structures. The monomer is used in the range from about 0.5 percent to about 20 percent by weight based upon the weight of the monomers charged, and more preferably from about 1 percent to about 5 percent by weight.

Other vinyl monomers containing a terminal vinylidene group ($CH_2=C<$) can be polymerized with the acrylic esters and vinyl benzyl chloride monomers, as long as an elastomeric polymer is obtained. These monomers may be used in up to about 30 percent by weight depending upon their effect on the Tg (glass transition temperature as determined by Differential Thermal Analysis) of the polymer. These monomers are more preferably used in up to about 10 percent by weight based on the weight of monomers charged. Examples of such monomers are vinyl and allyl ethers such as vinyl methyl ether, vinyl ethyl ether, allyl methyl ether, and the like; vinyl and allyl esters such as vinyl acetate, vinyl propionate, allyl acetate, allyl laurate, and the like; vinyl ketones such as methyl vinyl ketone, ethyl vinyl ketone, methyl isopropenyl ketone, hydroxymethyl vinyl ketone, and the like; methyl acrylate, cyclohexyl acrylate, phenyl acrylate, and the like; methacrylates such as methyl methacrylate, ethyl methacrylate, hexyl methacrylate, octyl methacrylate, and the like; vinyl aromatics such as styrene and its alkyl and halo substituents, vinyl toluene, and the like; vinyl halides such as vinyl chloride, vinylidene chloride, and the like; vinyl nitriles such as acrylonitrile and methacrylonitrile; unsaturated acids such as acrylic acid, methacrylic acid, maleic acid, itaconic acid, and the like; and also dienes and divinyls such as butadiene, isoprene, 1,4-hexadiene, and the like, and divinyl ether, diallyl ether, diethylene glycol diacrylate, and the like; and mixtures thereof.

The more preferred copolymerizable monomers are vinyl acetate, methyl acrylate, methyl and ethyl methacrylate, vinyl chloride, vinylidene chloride, acrylonitrile, acrylic and methacrylic acid, and butadiene and isoprene. The use of these monomers contributes favorably to specific properties of the novel acrylic ester elastomers such as solvent and oil resistance, flame retardancy, compatibility with dienic polymers, and the like.

The acrylic ester elastomers can be prepared using emulsion (latex), suspension, solution, and bulk techniques known to those skilled in the art. Because it is desirable to polymerize the monomers to 90 percent conversion or over, emulsion and suspension techniques are usually employed. The polymerization can be performed as a batch reaction, or one or more ingredients can be proportioned during the run. Temperature of polymerization ranges from about −10° C. to about 95° C., whereas a more preferred range is from about 5° C. to about 50° C. The polymerization is preferably conducted in the absence of air or oxygen.

The polymerization is initiated by free-radical generating agents. Examples of such agents are organic peroxides and hydroperoxides such as benzoyl peroxide, dicumyl peroxide, cumene hydroperoxide, paramethane hydroperoxide, and the like; used alone or with redox systems; azo compounds such as azobisisobutyronitrile and the like; persulfate salts such as sodium, potassium, and ammonium persulfate, used alone or with redox systems; and the use of ultra-violet light with photosensitive agents such as benzophenone, triphenylphosphine, organic azos, and the like.

Typical emulsion polymerization ingredients would include a persulfate salt or an organic peroxide and usually a redox system, water adjusted to a desired pH with acids or bases and usually buffered with inorganic salts, and either anionic, cationic, or nonionic surface active agents. Examples of such surface active agents are sodium, potassium, sulfonate, and phosphate esters of fatty acids, quaternary ammonium salts, polyglycol fatty acid esters, polyoxyethylated alkylated phenols and the like.

The resulting latices are stable emulsions, and may be handled and used as such. For example, they may be used to impregnate papers and other nonwoven materials to impart water resistance or increased wet and solvent tensile strength to the nonwoven. The latices can be coagulated to isolate the elastomer. Typical coagulation procedures are salt/acid coagulations; the use of polyvalent metal salts such as $CaCl_2$, $MgSO_4$, $Al_2(SO_4)_3$, and $AlCl_3$; use of alcohols such as methanol; and freeze agglomeration. The elastomer obtained is usually washed with water and dried.

The polymers are solid elastomers having a dilute solution viscosity (DSV) of over 0.5 as measured on a 0.4 percent by weight of polymer solution in methylethyl ketone. The DSV is measured on the soluble portion of the polymer. Percent gel, or insolubles, of the polymers range from almost 0% to over 60% by weight of the polymer. Raw polymer Mooney values range from about 20 to about 100 as measured at 212° F. using a large rotor (ML–4, 212° F.). The polymers contain from about 0.1 percent to about 5 percent by weight of chlorine as provided by the vinyl benzyl chloride, and more preferably from about 0.2 percent to about 1.0 percent by weight of chlorine.

The polymers are readily admixed with vulcanizing agents, and other compounding ingredients using two-roll mills, internal mixers such as Banburys and extruders, and like equipment.

Examples of vulcanizing agents are primary and secondary polyamines such as hexamethylenediamine carbamate, triethylenediamine, triethylenetetraamine, N,N'-dicinnamylidene-1,6-hexanediamine, and the like; fatty acid soaps such as sodium stearate, potassium stearate, potassium oleate, sodium laurate, and the like used with elemental sulfur or sulfur donors such as dipentamethylenethiuram hexasulfide, triethylthiuram disulfide, and the like (the soap/sulfur systems); dithiocarbamates used with trithiocyanuric acid; and ammonium salts of acids such as ammonium benzoate, ammonium adipate, ammonium stearate, and the like.

Other compound ingredients usually admixed with the polymers are stabilizers and antioxidants such as hindered phenols, phosphated phenols, and amines like phenyl-β-naphthylamine and the like; fillers such as carbon blacks, clays, silicas, asbestos, fiber glass, and the like; plasticizers, waxes, and oils; and other ingredients known to those skilled in the art.

The elastomers are cured at a temperature from about 250° F. to about 450° F., whereas a temperature range from about 275° F. to about 375° F. is more preferred. Cure time varies with cure temperature, ranging from about 4 minutes at 350° F. to over 20 minutes at 270° F. The polymers are typically tempered for about 3 hours to about 24 hours at a temperature from about 300° F. to about 375° F.

The previously known acrylic ester elastomer compositions having halogen cure sites have a tendency to pre-cure after the vulcanizing agents have been admixed. The phenomenon is called scorching, and it is evidenced by the polymer becoming tough and hard to process. Scorching is particularly troublesome when polyamine or soap/sulfur vulcanizing agents are used. Lower processing temperatures and the use of slow-curing vulcanizing agents can increase processing safety but this also results in increased operating time per unit and lower productivity. The elastomers of this invention provide increased process safety without increasing total processing or cure time. The use of the novel elastomers is particularly advantageous in injection molding and extrusion processes, as higher temperatures can be employed without fear of scorching the polymer.

The scorch time can be determined by following ASTM Procedure D1646, using a Mooney Viscometer at 250° F. with a large rotor, and measuring $T_5$ (minutes for the Mooney value to reach a minimum value and then to rise 5 units over the minimum value). That no increase in processing and cure time results is demonstrated by the fact that the novel elastomers are processed and cured at the same temperatures and times as known acrylic ester elastomers, and is evidenced by a comparison of the property development of the novel elastomers with other halide-bearing elastomers after tempering. The cured vulcanizates of these elastomers have the heat resistance, oil resistance, and oxygen and ozone resistance characteristic of polyacrylic ester elastomers, and are useful to prepare gaskets, seals, packings, coatings, and the like.

The following examples further illustrate the invention. Ingredients are given in parts by weight unless otherwise indicated. Testing was conducted according to ASTM procedures. Tensile and elongation followed ASTM D412; hardness, ASTM D676 (durometer A); oil aging and swell, ASTM D471; and raw polymer Mooney following ASTM D1646, run as ML–4–212° F. The test for scorch time determination was previously defined.

EXAMPLE I

Acrylic ester monomers were copolymerized with vinyl benzyl chloride monomer in an emulsion process. The following recipes were used. Also listed is the raw polymer Mooney, dilute solution viscosity, and percent gel of the elastomers made.

| | 1 | 2 | 3 | 4 | 5 | 6 |
|---|---|---|---|---|---|---|
| Ethyl acrylate | 98.3 | 97.4 | 48.2 | | | |
| n-Butyl acrylate | | | 25.4 | 50.0 | 66.0 | |
| Methoxyethyl acrylate | | | 25.0 | 48.5 | 32.5 | |
| Vinyl benzyl chloride | 1.7 | 2.6 | 1.4 | 1.5 | 1.5 | 1.0 |
| Gafac PE 150 [1] | 2.0 | 2.0 | 2.0 | 2.0 | 2.0 | 2.0 |
| NaOH [2] | 0.1 | 0.1 | 0.1 | 0.1 | 0.1 | 0.1 |
| $Na_2SO_4$ | 0.3 | 0.3 | 0.3 | 0.3 | 0.3 | 0.3 |
| Daxad 17 [3] | 0.5 | 0.5 | 0.5 | 0.5 | 0.5 | 0.5 |
| Hampene 100 [4] | 0.024 | 0.024 | 0.024 | 0.204 | 0.024 | 0.024 |
| Hampshire NaFe [5] | 0.01 | 0.01 | 0.01 | 0.01 | 0.01 | 0.01 |
| $Na_2S_2O_4$ | 0.02 | 0.02 | 0.02 | 0.02 | 0.02 | 0.02 |
| Sodium formaldehyde sulfoxalate | 0.04 | 0.04 | 0.04 | 0.04 | 0.04 | 0.04 |
| Paramethane hydroperoxide | 0.07 | 0.07 | 0.07 | 0.07 | 0.07 | 0.07 |
| Water | 100 | 100 | 100 | 100 | 100 | 100 |
| Temperature, °C | 20–35 | 20–31 | 20–28 | 20–30 | 20–25 | 20–27 |
| Reaction time, hours | 4 | 4 | 4 | 4 | 4 | 4 |
| Percent conversion | 97 | 96 | 97 | 99 | 95 | 99 |
| Raw polymer Mooney, ML–4–212° F. | 53 | 55 | 39 | 35 | 43 | 27 |
| DSV | 2.96 | 2.40 | 3.00 | 1.33 | 1.20 | 4.33 |
| Percent gel | 46 | 46 | 58 | 89 | 87 | ≈0 |

[1] Alkylphenoxypolyethyleneoxyethyl ester of phosphoric acid.
[2] 50% by weight NaOH in water.
[3] Condensed formaldehyde naphthalene.
[4] Tetrasodium ethylenediamine tetraacetate.
[5] Sodium ferric salt of ethylenediamine tetraacetic acid.

The acrylic ester monomer(s), the vinyl benzyl chloride, Gafac PE150, NaOH, Daxad 17, Hampshire NaFe, and one-half of the water were charged to a pre-mix tank and agitated. The remainder of the water and the Hampene 100 and the $Na_2SO_4$ were charge to a reactor vessel equipped for agitation. About 5 percent by weight of the pre-mix solution was then charged to the reactor followed by the $Na_2S_2O_4$, the sodium formaldehyde sulfoxalate, and the paramethane hydroxide. The reactor was evacuated of air, closed and the emulsion agitated. The remainder of the pre-mix solution was proportioned into the reactor over two hours time.

The elastomer was isolated from the resulting latex by coagulation using three volumes of a 2% by weight solution of $MgSO_4$ in 80° C. water to one volume of latex. The recovered rubber phase was washed three times with 80° C. water and then dried.

Similarly, acrylic ester elastomers are made using the emulsion polymerization procedure and employing up to 10 percent by weight of methyl methacrylate, acrylonitrile, and butadiene in partial replacement of the acrylic ester monomer.

EXAMPLE II

The polyacrylic ester elastomers prepared in Example I were cured using a soap/sulfur cure system. The recipes were:

|  | 1 | 2 | 3 | 4 | 5 | 6 |
|---|---|---|---|---|---|---|
| Elastomer | 100 | 100 | 100 | 100 | 100 | 100 |
| Acrawax C[1] | 2 | 2 | 2 | 2 | 2 | 2 |
| N550 black | 65 | 65 | 65 | 65 | 65 | 65 |
| Sulfur | 0.3 | 0.3 | 0.3 | 0.3 | 0.3 | 3.0 |
| Potassium stearate | 3.0 | 3.0 | 3.0 | 3.0 | 3.0 | 3.0 |

[1] Processing wax.

The elastomer was banded on a two-roll mill and the ingredients added. The compound was sheeted-off, cut into tensile sheets, and press-cured for 4 minutes at 338° F., followed by tempering for 8 hours at 347° F. The 4-minute cure stress-strain properties and a property analysis on the tempered samples are listed in the following table.

|  | 1 | 2 | 3 | 4 | 5 | 6 |
|---|---|---|---|---|---|---|
| Cured 4' at 338° F.: |  |  |  |  |  |  |
| 100% modulus, p.s.i | 520 | 470 | 330 | 480 | 440 | 220 |
| Tensile, p.s.i | 1,750 |  | 1,620 | 1,070 | 1,600 | 930 |
| Elongation, percent | 420 | 550 | 440 | 250 | 290 | 500 |
| Hardness, durometer A | 69 | 73 | 60 | 65 | 58 | 51 |
| Tempered: |  |  |  |  |  |  |
| 100% modulus, p.s.i | 1,010 | 980 | 820 |  | 1,280 | 420 |
| Tensile, p.s.i | 2,160 | 1,900 | 1,820 | 1,400 | 1,480 | 1,150 |
| Elongation, percent | 180 | 180 | 190 | 100 | 120 | 200 |
| Hardness, durometer A | 71 | 74 | 64 | 75 | 66 | 56 |
| ASTM #3 oil, 70 hours at 150° C.: |  |  |  |  |  |  |
| 100% modulus, p.s.i | 710 | (a) | 580 |  |  |  |
| Tensile, p.s.i | 1,920 | (a) | 1,360 | 1,000 | 910 | 300 |
| Elongation, percent | 190 | (a) | 170 | 100 | 90 | 90 |
| Hardness, durometer A | 56 | (a) | 48 | 55 | 44 | 20 |
| Percent volume swell | 16 | (a) | 20 | 25 | 42 | 121 | a Not run.

The tensile sheets were well formed and easily removed from the molds after the 4-minute cure, thus demonstrating that the elastomers readily cure using typical acrylic ester cure conditions. The tempered cure data shows that the novel elastomers have tensile, elongation, heat and oil resistance properties characteristic of polyacrylic esters. Sample 6, an n-butyl acrylate polymer, had a characteristic high oil swell.

Elastomers prepared using up to 10 percent by weight, based upon the weight of the monomers charged, of acrylonitrile have higher tensiles and lower oil swells. The acrylic ester elastomers containing butadiene or isoprene were sulfur-vulcanizable.

EXAMPLE III

Polyacrylic ester elastomers were prepared using various chlorine-bearing monomers in place of vinyl benzyl chloride. The emulsion recipe and procedure were similar to that of Example I. The monomers charged are listed in the following table.

|  | 1 | 2 | 3 | 4 | 5 |
|---|---|---|---|---|---|
| Ethyl acrylate | 98.3 | 97.8 | 98.7 | 98.5 | 98.8 |
| Vinyl benzyl chloride | 1.7 |  |  |  |  |
| 5-norbornenylmethyl chloroacetate |  | 2.2 |  |  |  |
| Vinyl chloroacetate |  |  | 1.3 |  |  |
| Allyl chloroacetate |  |  |  | 1.5 |  |
| Chloroethyl vinyl ether:[2] |  |  |  |  | 1.2 |
| Percent conversion | [1]95 | 93 | 97 | 99 | 99 |
| Raw polymer Mooney ML-4-212° F | [1]48 | 59 | 72 | 60 | 60 |

[1] Average data of three polymerizations.

The chlorine-bearing monomers were charged at equimolar levels. Since each monomer has only one chlorine atom, the chlorine contents of the prepared elastomers are similar.

EXAMPLE IV

The polyacrylic ester elastomers prepared in Example III were cured using the recipe; 100 parts elastomer, 65 parts N550 black, 2 parts Acrawax C, 0.3 part Spider Sulfur, and 3.0 parts potassium stearate. Mooney scorch data was run at 250° F. to measure comparative processing safety. Property development after 4 minutes at 338° F. and after tempering for 8 hours at 347° F. was measured.

|  | 1 | 2 | 3 | 4 | 5 |
|---|---|---|---|---|---|
| Mooney scorch data: |  |  |  |  |  |
| Minimum Mooney value | 69 | 69 | 110 | 105 | 79 |
| T5, minutes | 11 | 3.3 | 1.2 | 1.5 | >30 |
| 4 minutes at 338° F.: |  |  |  |  |  |
| 100% modulus, p.s.i | 820 | 520 | 990 | 1,040 | 100 |
| Tensile, p.s.i | 1,690 | 1,540 | 2,090 | 1,800 | 350 |
| Elongation, percent | 250 | 350 | 220 | 230 | 1,100 |
| Hardness, durometer A | 74 | 72 | 70 | 72 | 70 |
| Tempered 8 hours at 347° F.: |  |  |  |  |  |
| 100% modulus, p.s.i | 970 | 970 | 1,220 | 1,450 | 440 |
| Tensile, p.s.i | 1,820 | 1,980 | 2,320 | 2,180 | 1,200 |
| Elongation, percent | 210 | 220 | 180 | 170 | 380 |
| Hardness, durometer A | 73 | 74 | 71 | 73 | 71 |

The data shows that sample 1, the elastomer containing the vinyl benzyl chloride, had three to nine times the scorch safety as the other samples. Sample 5 is the elastomer containing chloroethyl vinyl ether as the cure site monomer. Although it has a long scorch time, both sets of cure data show the elastomer to be very slow curing and to have poor cured properties. The 4-minute cure property data shows that the vinyl benzyl chloride/acrylic ester elastomers cure at a rate comparable to that of the other elastomers, even though they provide much greater processing safety. While the greatest increase in scorch time is obtained when only vinyl benzyl chloride is used as the cure-site monomer (excluding the slow curing chloroethyl vinyl ether), combinations of the vinyl benzyl chloride monomer with other halide-bearing monomers can be used to provide intermediate scorch times.

EXAMPLE V

Elastomer samples 1, 2, 3 and 4 of Example III were also cured using a polyamine cure system. The polyamine cure was even more scorchy than the potassium stearate/sulfur cure used in Example IV, creating an even greater need for increased processing safety. The recipe used was: 100 parts elastomer, 65 parts N550 black, 2 parts Acrawax C, and 1 part Diak #1 (hexamethylenediamine carbamate). Scorch time and 4 minute cure properties were measured.

|  | 1 | 2 | 3 | 4 |
|---|---|---|---|---|
| Mooney scorch data: |  |  |  |  |
| Minimum Mooney value | 93 | None | None | 102 |
| T5, minutes | 5.7 | <1 | <1 | 2.1 |
| 4 minutes at 338° F.: |  |  |  |  |
| 100% modulus, p.s.i | 1,650 | 1,360 | 1,600 | 1,150 |
| Tensile, p.s.i | 2,300 | 2,090 | 2,500 | 2,140 |
| Elongation, percent | 130 | 160 | 140 | 170 |
| Hardness, durometer A | 78 | 77 | 70 | 73 |

Samples 3 and 4, containing 5-norbornenylmethyl chloroacetate and vinyl chloroacetate respectively as the cure-site monomer, were so scorchy that no dip in the Mooney curve was observed; i.e. the elastomers started to cure immediately. Sample 1, containing the vinyl benzyl chloride monomer, had a workable scorch time. The property data shows that all four elastomers had comparable states of cure after 4 minutes at 338° F., indicating that no increase in cure time was required for the vinyl benzyl chloride/acrylic ester elastomer.

We claim:
1. An elastomer comprising (A) at least 50 percent by weight of an acrylic ester of the formula

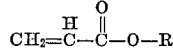

wherein R is selected from the group consisting of an alkyl radical containing 2 to 18 carbon atoms, an alkoxyalkyl radical containing 2 to 10 carbon atoms in the radical, and a cyanoalkyl radical containing 2 to 20 carbon atoms, (B) from about 0.5 percent to about 20 percent by weight of vinyl benzyl chloride, and (C) up to about 30 percent by weight of a copolymerizable vinyl monomer containing a terminal vinylidene group, all weights based upon the weight of the polymer.

2. An elastomer of claim 1 comprising at least 35 percent by weight of an acrylic ester wherein R is an alkyl radical containing 2 to about 10 carbon atoms, up to about 64 percent by weight of an acrylic ester wherein R is an alkoxyalkyl radical containing 2 to about 6 carbon atoms in the radical, and from about 1 percent to about 10 percent by weight of vinyl benzyl chloride.

3. An elastomer of claim 2 comprising up to about 10 percent by weight of a copolymerizable vinyl monomer selected from the group comprised of vinyl acetate, methyl acrylate, methyl methacrylate, ethyl methacrylate, vinyl chloride, vinylidene chloride, acrylic acid, methacrylic acid, butadiene, and isoprene.

4. An elastomer of claim 3 wherein the copolymerizable vinyl monomer is acrylonitrile.

5. An elastomer of claim 3 wherein the copolymerizable vinyl monomer is butadiene.

6. An elastomer of claim 3 wherein the copolymerizable vinyl monomer is methyl methacrylate.

7. An elastomer of claim 2 comprising from about 39 percent to about 55 percent by weight of ethyl acrylate, from about 20 percent to about 30 percent by weight of n-butyl acrylate, from about 20 percent to about 30 percent by weight of methoxyethyl acrylate, and from about 1 percent to about 5 percent by weight of vinyl benzyl chloride.

8. An elastomer of claim 2 comprising from about 97 percent to about 99 percent by weight of ethyl acrylate and from about 1 percent to about 3 percent by weight of vinyl benzyl chloride.

9. An elastomer of claim 1 in a cured state.

References Cited
UNITED STATES PATENTS
2,492,170   12/1949   Mast et al. _____ 260—86.1
3,450,681   6/1969    Gobran et al. _____ 260—80.72

JOSEPH L. SCHOFER, Primary Examiner
S. M. LEVIN, Assistant Examiner

U.S. Cl. X.R.
260—23 AR, 28.5 D, 32.8 A, 41 A, 41 C, 45.9 R, 45.95, 66, 80.7, 80.75, 80.77, 80.8, 80.81, 86.1 R